Patented Apr. 17, 1923.

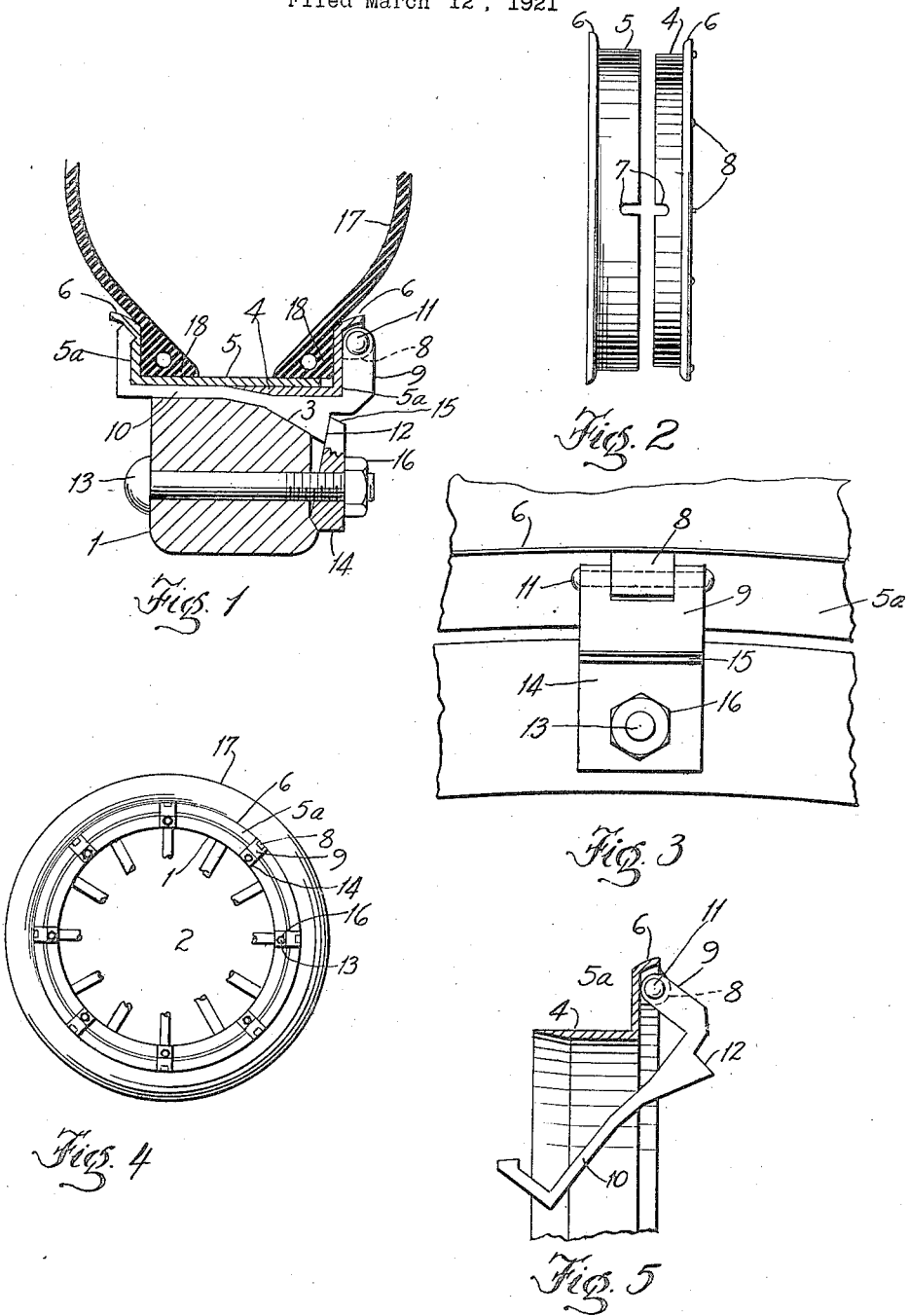

1,451,913

UNITED STATES PATENT OFFICE.

EVERT KOKKO, OF DULUTH, MINNESOTA.

VEHICLE WHEEL.

Application filed March 12, 1921. Serial No. 451,783.

*To all whom it may concern:*

Be it known that I, EVERT KOKKO, a citizen of the United States, residing at Duluth, in the county of St. Louis and State of Minnesota, have invented certain new and useful Improvements in Vehicle Wheels, of which the following is a specification.

This invention relates to improvements in vehicle wheels and more particularly to demountable rims therefor whereby to facilitate the application and removal of pneumatic tires when necessary. Novel means for retaining the rim in operative position are also provided. Simplicity in construction and efficiency in operation are objects attained.

With the foregoing and other objects in view the invention consists in the combination and arrangement of parts to be hereinafter fully described, pointed out in the appended claims and illustrated in the accompanying drawing which forms a part of this application and in which—

Fig. 1 is a section through a vehicle wheel constructed according to my present invention.

Fig. 2 is an edge view of the sectional rim, its component parts being separated.

Fig. 3 is a side view of Fig. 1.

Fig. 4 is a side view of the vehicle wheel.

Fig. 5 is a fragmentary view of Fig. 1 with one of the relatively movable parts in an altered position.

Like reference characters denote corresponding parts throughout the several views.

The reference numeral 1 denotes the felly of the wheel 2, and said felly is formed along one edge with a plurality of spaced bevelled portions 3 or, if preferred, this bevel may be made continuous. My rim proper comprises two telescoping portions 4, 5, it being a circumferentially split rim and each of its component portions is formed with an upstanding side portion 5ª and with an outwardly turned flange 6, said rim portions being formed also with the grooves 7 which, in the telescoped position of said portions, form a perforation for the tire valve.

The rim portion 4 and its flange 6 are formed with a plurality of ears 8 to which the bifurcated sides 9 of the substantially U-shaped yokes 10 are pivotally secured by the bolts 11, said yokes 10 being formed with the heels 12. The size or width of the yokes 10 is such that when the rim sections are telescoped said yokes will snugly span or straddle the sections, the sides of the U-shaped yokes being disposed against the sides of the rim sections immediately adjacent the outwardly turned flanges 6 and serving to positively retain the rim sections in telescoped position.

The rim is applied to the bevelled side of the felly and forced upon the felly, the rim sections being telescoped at the time and engaged by the rim yokes which rest directly upon the felly, the base of the heel portions resting upon the bevelled portion 3 of the felly. A plurality of bolts 13 extend through the felly, one for each rim yoke, and the rim is so applied to the felly that the yokes are disposed in alignment with the said bolts. Each bolt 13 carries a wedge block 14 having a bevelled end 15 which end, in one position of the block upon the bolt, is adapted for engagement with the heel 12 of the rim yoke 10. After the rim has been applied to the felly the wedge blocks 14 are moved upon the bolts 13 as a pivot until they engage with the heels 12. The blocks 14 are then tightened against the heels 12 and the felly by means of the nuts 16 on the bolts 13 and the rim thus securely fastened in position upon the felly. The tire 17 is applied to and removed from the rim in the usual manner, the clencher beads 18 being gripped by the rim.

To remove the rim it is only necessary to loosen the nuts 16, move the blocks 14 out of engagement with the rim yokes and the rim can be moved manually off the felly. When the rim is off the wheel the rim yokes can be dropped to the position shown in Fig. 5 and the rim sections spread apart and the tire removed.

What is claimed is:—

1. In a vehicle wheel, a felly having one bevelled edge, a rim, rim yokes pivotally carried by said rim and adapted for disposal upon the said felly, said rim yokes being adapted to snugly span the rim, heels integral with said rim yokes for engagement with the bevelled portions of said felly, and adjustable means carried by said felly for engaging said heels and binding them securely to the felly.

2. In a vehicle wheel, a felly having one bevelled edge, a rim, substantially U-shaped rim yokes pivotally carried by said rim and adapted for disposal upon the said felly, a portion of the base of said rim resting upon the bevelled portion of said felly, said rim yokes being adapted to snugly span said rim, and means carried by said felly for engagement with the base portions of said rim yokes for binding them firmly to the felly.

3. In a vehicle wheel, a felly having one bevelled edge, a rim, substantially U-shaped rim yokes pivotally carried by said rim, the sides of said rim yokes engaging with the side portions of the rim and the base of said rim resting upon the felly, heels formed integral with said rim yokes for disposal upon the bevelled portions of the felly, bolts carried by said felly, wedge blocks arranged upon said bolts for engagement with the said heels, and nuts upon said bolts for operative engagement with said wedge blocks.

In testimony that I claim the foregoing as my own I have hereto affixed my signature in the presence of two subscribing witnesses.

EVERT KOKKO.

Witnesses:
CARIS SALMINEN,
AAME A. HAVELA.